United States Patent
Ishida et al.

(10) Patent No.: US 10,018,935 B2
(45) Date of Patent: Jul. 10, 2018

(54) CONDUCTIVE MEMBER FOR ELECTROPHOTOGRAPHIC MACHINE

(71) Applicant: Sumitomo Riko Company Limited, Komaki-shi, Aichi (JP)

(72) Inventors: Masanori Ishida, Komaki (JP); Takayuki Ootani, Komaki (JP); Kunio Ito, Komaki (JP); Keisuke Tokoro, Komaki (JP)

(73) Assignee: SUMITOMO RIKO COMPANY LIMITED, Komaki-shi (JP)

( * ) Notice: Subject to any disclaimer, the term of this patent is extended or adjusted under 35 U.S.C. 154(b) by 9 days.

(21) Appl. No.: 15/488,896

(22) Filed: Apr. 17, 2017

(65) Prior Publication Data

US 2017/0227881 A1   Aug. 10, 2017

Related U.S. Application Data

(63) Continuation of application No. PCT/JP2015/080178, filed on Oct. 27, 2015.

(30) Foreign Application Priority Data

Oct. 28, 2014  (JP) ................................ 2014-219122

(51) Int. Cl.
| | |
|---|---|
| *G03G 15/02* | (2006.01) |
| *C08K 5/19* | (2006.01) |
| *C08K 3/04* | (2006.01) |
| *C08K 5/134* | (2006.01) |

(52) U.S. Cl.
CPC ........... *G03G 15/0233* (2013.01); *C08K 3/04* (2013.01); *C08K 5/134* (2013.01); *C08K 5/19* (2013.01); *C08K 2201/001* (2013.01)

(58) Field of Classification Search
CPC .................................................. G03G 15/0233
See application file for complete search history.

(56) References Cited

U.S. PATENT DOCUMENTS

| | | | | |
|---|---|---|---|---|
| 2011/0124478 A1* | 5/2011 | Tagawa | .................. | C08G 18/10 492/56 |
| 2012/0288306 A1* | 11/2012 | Ikegami | ............. | G03G 15/0233 399/130 |
| 2014/0274628 A1 | 9/2014 | Matsuda et al. | | |

FOREIGN PATENT DOCUMENTS

| | | |
|---|---|---|
| JP | 11-311891 A | 11/1999 |
| JP | 2008-129520 A | 6/2008 |
| JP | 2014-126798 A | 7/2014 |

OTHER PUBLICATIONS

International Search Report dated Dec. 22, 2015, issued in counterpart application No. PCT/JP2015/080178, w/English translation. (3 pages).

* cited by examiner

*Primary Examiner* — Ryan Walsh
(74) *Attorney, Agent, or Firm* — Westerman, Hattori, Daniels & Adrian, LLP

(57) ABSTRACT

To provide a conductive member for an electrophotographic machine that is capable of preventing hardening degradation of a surface layer that is caused by an ionic conductive agent contained in a conductive rubber elastic body layer, allowing the surface layer to be improved in durability.

A conductive member 10 for an electrophotographic machine includes a conductive rubber elastic body layer 14 containing crosslinked rubber and an ionic conductive agent, and a surface layer 16 provided on an outer periphery of the conductive rubber elastic body layer 14, wherein the surface layer 16 contains a polymer and polyphenol. Examples of the polyphenol include a tannin, gallic acid, ellagic acid, pyrogallol, catechin, and chlorogenic acid.

20 Claims, 2 Drawing Sheets

CONDUCTIVE MEMBER FOR ELECTROPHOTOGRAPHIC MACHINE

TECHNICAL FIELD

The present disclosure relates to conductive members for an electrophotographic machine.

BACKGROUND ART

Electrophotographic machines such as a copier, a printer, and a fax machine using an electrophotographic method contain conductive members including conductive rolls such as a charging roll, a developing roll, a transfer roll, and a toner supply roll, and conductive belts such as a transfer belt and a fixing belt. Conventionally, as the conductive members of this type, there are known conductive members containing a conductive rubber elastic body layer that is provided with a surface layer on its outer periphery. The conductive rubber elastic body layers sometimes contain an ionic conductive agent that demonstrates uniform conductivity.

CITATION LIST

Patent Literature

Patent Document 1: Patent JP2008-129520

SUMMARY

Problems to be Solved

As the lifetime of electrophotographic machines has been prolonged, electrical and physical loads imposed on their conductive members have been increased. Under these circumstances, the ions in the ionic conductive agent contained in the conductive rubber elastic body layer are transferred to the surface layer to cause hardening degradation of the surface layer, whereby the surface layer decreases in elongation to cause cracks.

An object of the present disclosure is to provide a conductive member for an electrophotographic machine that is capable of preventing hardening degradation of a surface layer that is caused by an ionic conductive agent contained in a conductive rubber elastic body layer, allowing the surface layer to be improved in durability.

Means for Solving the Problem

To achieve the objects and in accordance with the purpose of the present disclosure, the present disclosure is to provide a conductive member for an electrophotographic machine that includes a conductive rubber elastic body layer comprising cross-linked rubber and an ionic conductive agent, and a surface layer provided on an outer periphery of the conductive rubber elastic body layer. The surface layer contains a polymer and polyphenol.

It is preferable that the ionic conductive agent should contain anions that are one or more kinds selected from the group consisting of perchlorate anions, bis(trifluoromethanesulfonyl)imide anions, trifluoromethanesulfonate anions, chloride anions, bromide anions, and p-toluenesulfonate anions.

It is preferable that the polyphenol should include one or more kinds selected from the group consisting of a tannin, gallic acid, ellagic acid, pyrogallol, catechin, and chlorogenic acid. It is preferable that the tannin should be a hydrolyzable tannin.

It is preferable that the conductive member for an electrophotographic machine should be a charging roll.

Advantageous Effects

With the conductive member for an electrophotographic machine according to an embodiment of the present invention, since the surface layer contains polyphenol, hardening degradation of the surface layer that is caused by the ions in the ionic conductive agent that are transferred from the conductive rubber elastic body layer to the surface layer can be prevented, allowing the surface layer to be improved in durability, even under the circumstances where the lifetime of electrophotographic machines has been prolonged, and electrical and physical loads imposed on their conductive members have been accordingly increased.

DESCRIPTION OF EMBODIMENTS

Hereinafter, a description of a conductive member for an electrophotographic machine according to an embodiment of the present invention will be provided.

The conductive member for an electrophotographic machine according to an embodiment of the present invention is suitably used for conductive members including conductive rolls such as a charging roll, a developing roll, a transfer roll, and a toner supply roll, and conductive belts such as a transfer belt and a fixing belt that are provided to electrophotographic machines such as a copier, a printer, and a fax machine using a electrophotographic method.

Figure 1A:
FIG. 1A is a perspective view of a conductive roll for an electrophotographic machine according to one embodiment of the present invention.
Figure 1B:
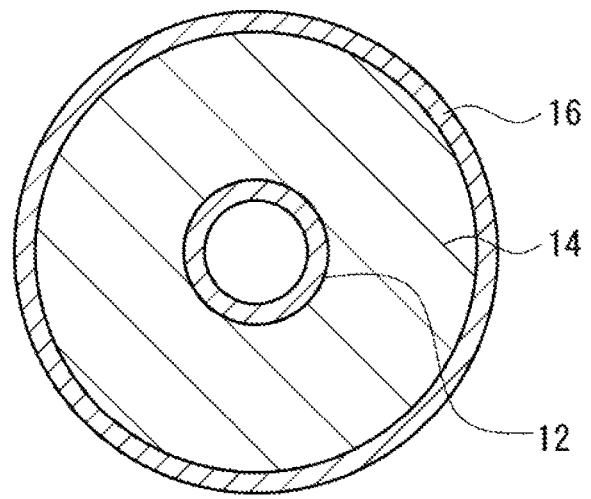
FIG. 1B is a cross-sectional view of the same in the circumferential direction.
Figure 2A:
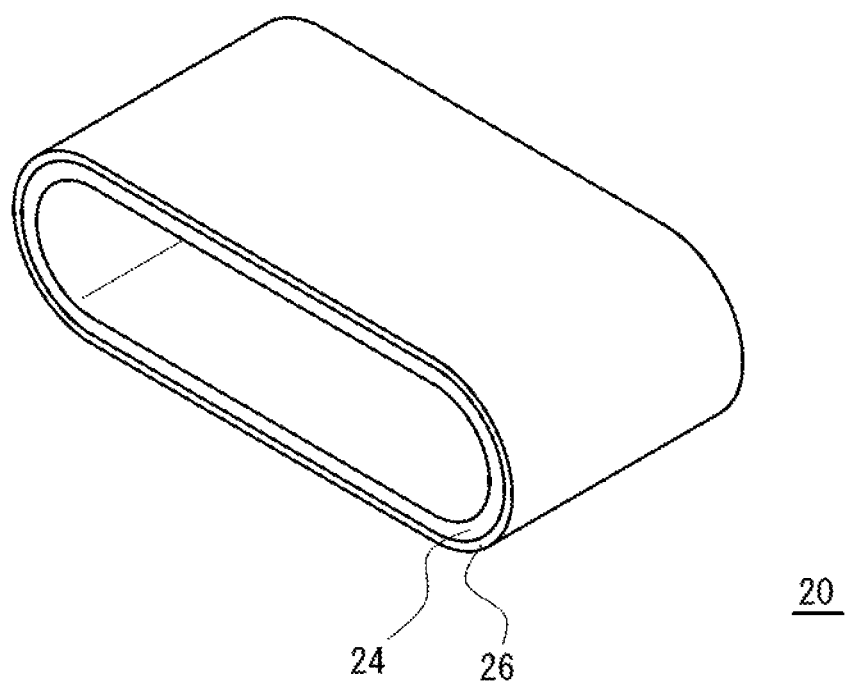
FIG. 2A is a perspective view of a conductive belt for an electrophotographic machine according to one embodiment of the present invention.
Figure 2B:
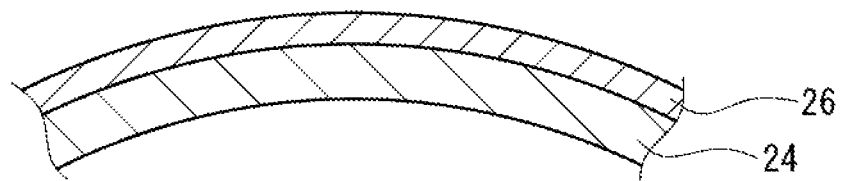
FIG. 2B is a partial cross-sectional view of the same in the circumferential direction.

The conductive member for an electrophotographic machine according to an embodiment of the present invention includes a conductive rubber elastic body layer, and a surface layer provided on the outer periphery of the conductive rubber elastic body layer. FIGS. 1A and 1B are views of a conductive roll as the conductive member, showing one embodiment of the present invention. FIGS. 2A and 2B are views of a conductive belt as the conductive member, showing one embodiment of the present invention.

As shown in FIGS. 1A and 1B, a conductive member 10 for an electrophotographic machine according to one embodiment of the present invention (hereinafter, referred to sometimes as the "conductive roll 10") includes a shaft body 12, a conductive rubber elastic body layer 14 provided on the outer periphery of the shaft body 12, and a surface layer 16 provided on the outer periphery of the conductive rubber elastic body layer 14. The conductive rubber elastic body layer 14 is disposed in contact with the shaft body 12. The surface layer 16 is disposed in contact with the conductive rubber elastic body layer 14.

The shaft body 12 is not limited particularly if having conductive properties. Specific examples of the shaft body 12 include solid or hollow cores that are made from metal such as iron, stainless steel, and aluminum. An adhesive agent, a primer, or the like may be applied on the surface of the shaft body 12 as necessary. That is, the conductive rubber elastic body layer 14 may be bonded to the shaft body 12 via an adhesive layer (a primer layer). The adhesive agent, the primer, or the like may be made conductive as necessary.

The conductive rubber elastic body layer 14 contains cross-linked rubber and an ionic conductive agent. The conductive rubber elastic body layer 14 is made from a conductive rubber composition that contains uncrosslinked rubber and an ionic conductive agent. The cross-linked rubber is obtained by cross-linking the uncrosslinked rubber. The uncrosslinked rubber may be polar rubber or non-polar rubber. Polar rubber is preferred as the uncrosslinked rubber from the viewpoint of having excellent conductive properties and the like.

The polar rubber defines rubber having a polar group, and examples of the polar group include a chloro group, a nitrile group, a carboxyl group, and an epoxy group. Specific examples of the polar rubber include hydrin rubber, nitrile rubber (NBR), urethane rubber (U), acrylic rubber (a copolymer of acrylic acid ester and 2-chloroethyl vinyl ether, ACM), chloroprene rubber (CR), and epoxidized natural rubber (ENR). Hydrin rubber or nitrile rubber (NBR) is preferred as the polar rubber from the viewpoint of especially reducing the volume resistivity.

Examples of the hydrin rubber include an epichlorohydrin homopolymer (CO), an epichlorohydrin-ethylene oxide binary copolymer (ECO), an epichlorohydrin-allylglycidylether binary copolymer (GCO), and an epichlorohydrin-ethylene oxide-allylglycidylether ternary copolymer (GECO).

Examples of the urethane rubber include polyether type urethane rubber that has an ether bond in its molecule. The polyether type urethane rubber can be produced by the reaction of polyether having hydroxy groups at both terminals and diisocyanate. Examples of the polyether include, but are not limited to, polyethylene glycol, and polypropylene qlycol. Examples of the diisocyanate include, but are not limited to, tolylene diisocyanate and diphenylmethane diisocyanate.

Examples of the ionic conductive agent include a quaternary ammonium salt and a quaternary phosphonium salt. Among them, the quaternary ammonium salt is preferred considering that the ionic conductive agent is hard to bleed from the conductive rubber elastic body layer 14 during endurance under an energized condition.

Examples of the cations of the quaternary ammonium salt include cations indicated in the following Chemical formula (1).
(Chemical Formula 1)

$$R_1R_2R_3R_4N^+ \qquad (1)$$

In Chemical formula (1), each of the $R_1$, $R_2$, $R_3$, and $R_4$ represents a substituent group bonded to a nitrogen atom, that is, a C1-C18 alkyl group or aryl group, and specifically represents a methyl group, an ethyl group, a propyl group, a butyl group, a hexyl group, an octyl group, a decyl group, a phenyl group, a xylyl group, or the like. The $R_1$, $R_2$, $R_3$, and $R_4$ may be substitute groups of the same type, may be substitute groups of different types, or may be substitute groups of partially different types.

In Chemical formula (1), the ionicity is likely to decrease as the alkyl groups or aryl groups that are non-polar groups have a longer carbon chain, so that it is preferable that three of the four alkyl groups should be alkyl groups having not more than four carbon atoms while the other one should be a C1-C16 alkyl group from the viewpoint of reduction in resistance.

Examples of the cations of the quaternary phosphonium salt include cations indicated in the following Chemical formula (2).
(Chemical Formula 2)

$$R_5R_6R_7R_8P^+ \qquad (2)$$

In Chemical formula (2), each of the $R_5$, $R_6$, $R_7$, and $R_8$ represents a substituent group bonded to a phosphorus atom, that is, a C1-C18 alkyl group or aryl group, and specifically represents a methyl group, an ethyl group, a propyl group, a butyl group, a hexyl group, an octyl group, a decyl group, a phenyl group, a xylyl group, or the like. The $R_5$, $R_6$, $R_7$, and $R_8$ may be substitute groups of the same type, may be substitute groups of different types, or may be substitute groups of partially different types.

In Chemical formula (2), the ionicity is likely to decrease as the alkyl groups or aryl groups that are non-polar groups have a longer carbon chain, so that it is preferable that three of the four alkyl groups should be alkyl groups having not more than four carbon atoms while the other one should be a C1-C16 alkyl group from the viewpoint of reduction in resistance.

Specific examples of the anions of the ionic conductive agent include perchlorate anions ($ClO_4^-$), bis(trifluoromethanesulfonyl)imide anions (TFSI), trifluoromethanesulfonate anions (TF), chloride anions ($Cl^-$), bromide anions ($Br^-$), and p-toluenesulfonate anions (TS). The anions of the ionic conductive agent may be of one kind, or two or more kinds selected from the above anions. Among them, the $ClO_4^-$, the TFSI, and the TF are particularly preferred from the viewpoint of easy dissociation in polar rubber. In addition, the perchlorate anions ($ClO_4^-$) are preferred from the viewpoint of, for example, improving the charging properties of the charging roll.

The content of the ionic conductive agent is preferably 0.1 parts by mass or more with respect to 100 parts by mass of the uncrosslinked rubber from the viewpoint of securing desired conductive properties, and the like. In addition, since an increased amount of the ionic conductive agent prolongs the lifetime of electrophotographic machines, the content of the ionic conductive agent is preferably 0.3 parts by mass or more with respect to 100 parts by mass of the uncrosslinked rubber from the viewpoint of prolonging the lifetime of electrophotographic machines, and more preferably 0.5 parts by mass or more. On the other hand, the content of the ionic conductive agent is preferably 10 parts by mass or less with respect to 100 parts by mass of the uncrosslinked rubber, and more preferably 5 parts by mass or less. This is because if the content of the ionic conductive agent is too much, the ionic conductive agent is likely to bleed from the conductive rubber elastic body layer 14 during endurance under an energized condition.

Examples of a cross-linking agent to be used include a sulfur cross-linking agent, a peroxide cross-linking agent, and a dechlorination cross-linking agent. Among them, a single kind of cross-linking agent may be used alone, or two or more kinds of cross-linking agents may be used in combination.

Examples of the sulfur cross-linking agent include conventionally known sulfur cross-linking agents such as powdered sulfur, precipitated sulfur, colloidal sulfur, surface treated sulfur, insoluble sulfur, sulfur chloride, a thiuram-based vulcanization accelerator, and a polysulfide.

Examples of the peroxide cross-linking agent include conventionally known peroxide cross-linking agents such as a peroxy ketal, a dialkyl peroxide, a peroxyester, a ketone peroxide, a peroxydicarbonate, a diacylperoxide, and a hydroperoxide.

Examples of the dechlorination cross-linking agent include a dithiocarbonate compound, and specific examples thereof include quinoxalin-2,3-dithiocarbonate, 6-methylquinoxalin-2,3-dithiocarbonate, 6-isopropylquinoxalin-2,3-dithiocarbonate, and 5,8-dimethylquinoxalin-2,3-dithiocarbonate.

The amount of the cross-linking agent is preferably in the range of 0.1 to 2 parts by mass with respect to 100 parts by mass of the uncrosslinked rubber, more preferably in the range of 0.3 to 1.8 parts by mass, and still more preferably in the range of 0.5 to 1.5 parts by mass, from the viewpoint of hardly bleeding.

When using the dechlorination cross-linking agent as the cross-linking agent, a dechlorination cross-linking promoter may be used together. Examples of the dechlorination cross-linking promoter include 1,8-diazabicyclo(5,4,0)undecene-7 (hereinafter, abbreviated as the DBU), and a weak acid salt thereof. The dechlorination cross-linking promoter may be used in the form of DBU; however, it is preferable for the DBU to be used in the form of a weak acid salt from the viewpoint of its ease of handling. Examples of the weak acid salt of the DBU include a carbonate, a stearate, a 2-ethylhexyl salt, a benzoate, a salicylate, a 3-hydroxy-2-naphthoic acid salt, a phenol resin salt, a 2-mercaptobenzothiazole salt, and a 2-mercaptobenzimidazole salt.

The content of the dechlorination cross-linking promoter is preferably in the range of 0.1 to 1 parts by mass with respect to 100 parts by mass of the polar rubber, more preferably in the range of 0.3 to 1.8 parts by mass, and still more preferably in the range of 0.5 to 1.5 parts by mass, from the viewpoint of hardly bleeding.

One or more kinds of additives such as an electroconductive agent such as carbon black, a lubricant, an anti-aging agent, a light stabilizer, a viscosity modifier, a processing aid, a flame retardant, a plasticizing agent, a foaming agent, a filler, a dispersing agent, an antifoaming agent, a colorant, and a mold-releasing agent may be added to the conductive rubber elastic body layer 14 as necessary.

The conductive rubber elastic body layer 14 can be adjusted so as to have a predetermined volume resistivity in accordance with the kind of the cross-linked rubber, the amount of the ionic conductive agent, the composition of the electroconductive agent, and the like. The volume resistivity of the conductive rubber elastic body layer 14 may be set as appropriate in the ranges of $10^2$ to $10^{10}$ Ω·cm, $10^3$ to $10^9$ Ω·cm, $10^4$ to $10^8$ Ω·cm, and the like in accordance with the application.

The thickness of the conductive rubber elastic body layer 14 is not limited particularly, and can be adjusted as appropriate in the range of 0.1 to 10 mm in accordance with the application.

The surface layer 16 can function as a protection layer for the surface. The surface layer 16 is mainly made from, but is not limited to, a polyamide (nylon) based polymer, an acrylic based polymer, a urethane based polymer, a silicone based polymer, and a fluorine based polymer. These polymers may be modified. Examples of the modifying group include an N-methoxymethyl group, a silicone group, and a fluorine group.

The essential component of the surface layer 16 is polyphenol, in addition to the polymer as a main component. That is, the surface layer 16 contains polyphenol in addition to the polymer as the main component. Polyphenol has the function of reducing a substance having an oxidizing property, and thus prevents degradation (hardening degradation) of the polymer in the surface layer 16 that is caused by the oxidizing substance. Examples of the polyphenol include a tannin, gallic acid, ellagic acid, pyrogallol, catechin, and chlorogenic acid. Among them, a single kind of polyphenol may be used alone, or two or more kinds of polyphenol may be used in combination. When the surface layer 16 is subjected to a heat treatment during its formation for the purpose of cross-linking, drying, or the like, it is preferable that the contained polyphenol should not be decomposed by the heat treatment, so that polyphenol that has a decomposition temperature higher than the heat, treatment temperature is preferred in this case. To be specific, the polyphenol that has a decomposition temperature of 200 degrees C. or higher is preferred. A tannin, gallic acid, ellagic acid, pyrogallol, catechin, and chlorogenic acid all have a decomposition temperature of 200 degrees C. or higher. Ascorbic acid, which is not included in the examples of polyphenol, is a compound having two hydroxy groups while being not a compound having a phenolic hydroxy group. Ascorbic acid has no effect of preventing degradation (degradation caused by hardening) of the polymer in the surface layer 16 that is caused by an oxidizing substance. In addition, ascorbic acid has a decomposition temperature lower than 200 degrees C., and cannot be used when performing a heat, treatment.

The content of the polyphenol is preferably 0.3 parts by mass or more with respect to 100 parts by mass of the polymer, more preferably 0.5 parts by mass or more, and still more preferably 1.0 part by mass or more, from the viewpoint of achieving excellent effect of preventing degradation (hardening degradation) of the polymer in the surface layer 16 that is caused by an oxidizing substance. On the other hand, the content of the polyphenol is preferably 5.0 parts by mass or less with respect to 100 parts by mass of the polymer, and more preferably 4.0 parts by mass or less, and still more preferably 3.0 parts by mass or less, from the viewpoints of hardly hindering the polymer in the surface layer 16 from being cross-linked (hardly degrading the setting properties) and easily securing the polymer amount in the surface layer 16 to secure the elasticity.

A tannin falls roughly into two categories in terms of chemical structure: a hydrolyzable tannin and a condensed tannin. A condensed tannin defines tannin made from multiple molecules of catechin that are carbon-carbon bonded to be condensed. A hydrolyzable tannin is made from polyphenol acid and polyalcohol, and produces polyphenol acid and polyalcohol by being hydrolyzed. In a hydrolyzable tannin, examples of the polyphenol acid include gallic acid, a dimer of gallic acid, and ellagic acid. A tannin of which polyphenol acid is gallic acid defines gallotannin, and a tannin of which polyphenol acid is a dimer of gallic acid or ellagic acid defines ellagitannin. Examples of the polyalcohol include sugar (glucose) and cyclic polyalcohol other than sugar. In a hydrolyzable tannin, tannic acid defines a tannin obtained from a gall or a gallnut, and defines a compound in which, gallic acid or acidium gallicum is ester bonded to all of the hydroxy groups of the glucose, and further ester bonded to phenolic hydroxy groups.

A hydrolyzable tannin is preferred as the tannin from the viewpoint of having excellent solubility or dispersibility in a (aqueous or organic) solvent and considering that the surface layer forming material containing the hydrolyzable tannin has excellent coating properties. A hydrolyzable tannin is decomposed by water, oxygen, or the like, and a decomposition product thereof contains polyphenol acid. To be specific, the decomposition product is also polyphenol, and has the function of reducing a substance having an oxidizing property.

Conventionally known conductive agents such as carbon black, graphite, c-$TiO_2$, c-ZnO, c-$SnO_2$ (c-indicates conductive properties), ionic conductive agents (a quaternary ammonium salt, a borate salt, a surfactant, and the like) may be added to the surface layer as appropriate in order to impart conductive properties thereto. In addition, various kinds of additives may be added thereto as appropriate as the need, arises. Examples of the additives include a lubricant, a vulcanization accelerator, an anti-aging agent, a light stabilizer, a viscosity modifier, a processing aid, a flame retardant, a plasticizing agent, a foaming agent, a filler, a dispersing agent, an antifoaming agent, a colorant, and a mold-releasing agent.

The thickness of the surface layer is not limited particularly, but is preferably in the range of 0.1 to 100 μm, and more preferably in the range of 0.1 to 20 μm, and still more preferably in the range of 0.3 to 10 μm. The volume resistivity of the surface layer is preferably in the range of $10^4$ to $10^9$ Ω·cm, and more preferably in the range of $10^5$ to $10^8$ Ω·cm, and still more preferably in the range of $10^6$ to $10^7$ Ω·cm.

The conductive roll 10 can be produced as follows, for example. First, a shaft body 12 is placed in a hollow portion of a roll forming mold so as to be coaxial therewith, and an uncrosslinked conductive rubber composition is poured thereinto to be subjected to heating and curing (cross-linking), and is then released from the mold, or an uncrosslinked conductive rubber composition is extrusion-molded on the surface of the shaft body 12, and thus a conductive rubber elastic body layer 14 is formed on the outer periphery of the shaft body 12. Then, a surface layer forming composition is applied on the outer periphery of the thus-made conductive rubber elastic body layer 14 to be subjected to ultraviolet irradiation or a heat treatment as necessary, whereby a surface layer 16 is formed. Thus, the conductive roll 10 is produced. Examples of the application method include various kinds of coating methods such as a roll-coating method, a dipping method, and a spray coating method. Since the surface layer 16 can be formed in the application method, the surface layer 16 can be formed thinly and evenly, and thus can easily obtain an even surface resistance.

The surface layer forming composition contains the above-described main component, the conductive agent, and other additives that are added thereto as necessary. The surface layer forming composition is preferably in a liquid form so as to lie capable of being applied in a coating method. The surface layer forming composition may contain solvents including organic solvents such as methyl ethyl ketone, toluene, acetone, ethyl acetate, butyl acetate, methyl isobutyl ketone (MIBK), THF, and DMF, and aqueous solvents such as methanol and ethanol as appropriate from the viewpoint of adjusting the viscosity.

The configuration of the conductive roll according to an embodiment of the present invention is not limited to the configuration shown in FIG. 1. For example, the conductive roll 10 shown in FIG. 1 may include an additional conductive rubber elastic body layer between the shaft, body 12 and the conductive rubber elastic body layer 14. In this case, the additional conductive rubber elastic body layer defines a layer that becomes a base for the conductive roll, and the conductive rubber elastic body layer 14 functions as, for example, a resistance adjusting layer arranged to adjust the resistance of the conductive roll. The additional conductive rubber elastic body layer can be made front, for example, any of the materials described above from which the conductive rubber elastic body layer 14 is made.

In addition, the conductive roll 10 shown in FIG. 1 may include an additional conductive rubber elastic body layer between the conductive rubber elastic body layer 14 and the surface layer 16. In this case, the conductive rubber elastic body layer 14 defines a layer that becomes a base for the conductive roll, and the additional conductive rubber elastic body layer functions as, for example, a resistance adjusting layer arranged to adjust the resistance of the conductive roll. The additional conductive rubber elastic body layer can be made from, for example, any of the materials described above from which the conductive rubber elastic body layer 14 is made.

Next, as shown in FIGS. 2A and 2B, a conductive belt 20 for an electrophotographic machine according to one embodiment of the present invention (hereinafter, referred to sometimes as the "conductive belt 20") includes a conductive rubber elastic body layer 24, and a surface layer 26 provided on the outer periphery of the conductive rubber elastic body layer 24. The surface layer 26 is disposed in contact with the conductive rubber elastic body layer 24.

The conductive rubber elastic body layer 24 of the conductive belt 20 is made from the same materials as the conductive rubber elastic body layer 14 of the conductive roll 10. In addition, the surface layer 26 of the conductive belt 20 is made from the same materials as the surface layer 16 of the conductive roll 10.

In the conductive belt 20, the conductive rubber elastic body layer 24 can be adjusted so as to have a predetermined volume resistivity in accordance with the kind of the cross-linked rubber, the amount of the ionic conductive agent, the composition of the electroconductive agent, and the like. The volume resistivity of the conductive rubber elastic body layer 24 may be set as appropriate in the ranges of $10^2$ to $10^{10}$ Ω·cm, $10^3$ to $10^9$ Ω·cm, $10^4$ to $10^8$ Ω·cm, and the like in accordance with the application. In the conductive belt 20, the thickness of the conductive rubber elastic body layer 24 is not limited particularly, and can be adjusted as appropriate in the range of 0.1 to 10 mm in accordance with the application.

In the conductive belt 20, the thickness of the surface layer 26 is not limited particularly, and is preferably in the range of 0.01 to 100 μm, and more preferably in the range of 0.1 to 20 μm, and still more preferably in the range of 0.3 to 10 μm. In the conductive belt 20, the volume resistivity of the surface layer 26 is preferably in the range of $10^4$ to $10^9$ Ω·cm, and more preferably in the range of $10^5$ to $10^8$ Ω·cm, and still more preferably in the range of $10^6$ to $10^7$ Ω·cm.

The conductive belt 20 can be produced as follows, for example. First, the surface of a circular cylindrical mold is spray coated with an uncrosslinked conductive rubber composition, and the composition is subjected to heating and curing (cross-linking), and thus a conductive rubber elastic body layer 24 is formed. Then, the outer periphery of the conductive rubber elastic body layer 24 is spray coated with a surface layer forming composition, and the composition is subjected to heating and curing, and thus a surface layer 26 is formed. Then, by blowing air between the conductive rubber elastic body layer 24 and the circular cylindrical mold to remove the circular cylindrical mold, a conductive belt 20 is produced. It is to be noted that the above-described specific uncrosslinked conductive rubber composition may contain a solvent as appropriate for a spray coating purpose.

The configuration of the conductive belt according to an embodiment, of the present invention is not limited to the configuration shown in FIGS. 2A and 2B. For example, the conductive belt 20 shown in FIGS. 2A and 2B may include an additional conductive rubber elastic body layer between the conductive rubber elastic body layer 24 and the surface layer 26. In this case, the conductive rubber elastic body layer 24 defines a layer that becomes a base for the conductive belt 20, and the additional conductive rubber elastic body layer functions as, for example, a resistance adjusting layer arranged to adjust the resistance of the conductive belt. The additional conductive rubber elastic body layer can be made front, for example, any of the materials described above from which the conductive rubber elastic body layer 24 is made.

In the conductive member for an electrophotographic machine having the above-described configuration, the ionic conductive agent contained in the conductive rubber elastic body layer is polarized when the electrophotographic machine is energized, and the anion constituent of the polarized ionic conductive agent is transferred to the surface of the conductive rubber elastic body layer. The anion constituent is transferred also to the surface layer in contact with the conductive rubber elastic body layer, or also to the surface layer in contact with the conductive rubber elastic body layer via an additional layer. For example, the anion constituent of the ionic conductive agent such as $ClO_4^-$ has a high oxidizing property to oxidize and degrade the polymer component in the surface layer. The degradation caused by the oxidization exerts a larger influence upon the polymer component as electrical and physical loads imposed on the conductive members become larger with the prolonged lifetime of electrophotographic machines. In the embodiment of the present invention, since the surface layer contains polyphenol having the function of reducing a substance having an oxidizing property, degradation (hardening degradation) of the polymer in the surface layer caused by the substance having an oxidizing property can be suppressed. Thus, even when electrical and physical loads imposed on the conductive members become larger with the prolonged lifetime of electrophotographic machines, hardening degradation of the surface layer caused by the ions in the ionic conductive agent that are transferred from the conductive rubber elastic body layer can be prevented, allowing the surface layer to foe improved in durability.

EXAMPLES

Hereinafter, a detailed description of embodiments of the present invention will be provided with reference to Examples.

Example 1

Preparation of a Conductive Rubber Composition

A conductive rubber composition was prepared by adding 3 parts by mass of ionic conductive agent <1> (tetra-n-butylammonium perchlorate, $n-Bu_4N.ClO_4$) and 2 parts by mass of sulfur ("IOU-PTC" manufactured by TSURUMI CHEMICAL INDUSTRY CO., LTD.) that defines a cross-linking agent to 100 parts by mass of hydrin rubber (ECO, "Hydrin T3106" manufactured by ZEON CORPORATION), and the thus-made mixture was agitated with the use of an agitator.

Preparation of a Surface Layer Forming Composition

A surface layer forming composition was prepared by mixing 100 parts by mass of N-methoxymethylated nylon ("EF30T" manufactured by NAGASE CHEMTEX CORPORATION), 2 parts by mass of tannic acid (a reagent manufactured by KANTO CHEMICAL CO., INC.), 15 parts by mass of an electreconductive agent (carbon black, "Ketjenblack EC" manufactured by KETJENBLACK INTERNATIONAL. CO.), 1 part by mass of citric acid, and 300 parts by mass of methanol.

Preparation of an Evaluation Sample

A rubber sheet having a thickness of 2 mm was produced by subjecting the prepared conductive rubber composition to press cross-linking molding at 180 degrees C. for 20 minutes. Next, the prepared surface layer forming composition was deposited on the produced rubber sheet by bar-coating, and then subjected to a heat treatment at 120 degrees C. for 50 minutes to form a surface layer having a thickness of 10 μm. Thus, an evaluation sample was produced.

Examples 2 to 5

Evaluation samples were produced in the same way as Example 1, except that different types of ionic conductive agents were used in preparing the conductive rubber compositions.

Ionic conductive agent <2>: tetra-n-butylammonium bromide, $n-Bu_4N.Br$

Ionic conductive agent <3>: tetra-n-butylammonium chloride, $n-Bu_4N.Cl$

Ionic conductive agent <4>: tri-n-butyldodecyl phosphonium=trifluoromethanesulfonate, $(C4)_3(C12)P•TF$ Ionic conductive agent <5>: tri-n-butyldodecyl phosphonium=bis(trifluoromethane sulfonyl)imide, $(C4)_3(C12)P•TFSI$ Synthesis of Ionic Conductive Agent <4>

Tri-n-butyldodecyl phosphonium bromide and lithium trifluoromethanesulfonate were added to a mixed liquid of methylene chloride and ion-exchange water (1:1) to be agitated at room temperature for four hours to obtain tri-n-butyldodecyl phosphonium=trifluoromethanesulfonate from the organic layer. The cationic species of the phosphonium salt are abbreviated as "(C4), (C12)P". The anion species of the phosphonium salt are abbreviated as "TF".

Synthesis of Ionic Conductive Agent <5>

Tri-n-butyldodecyl phosphonium=bis(trifluoromethane sulfonyl)imide was obtained in the same way as ionic conductive agent <4>, except that bis(trifluoromethanesulfonyl)imidic acid, instead of lithium trifluoromethanesulfonate, was used in the synthesis of the phosphonium salt. The cat ionic species of the phosphonium salt are abbreviated as "(C4), (C12)P". The anion species of the phosphonium salt are abbreviated as "TFSI".

Examples 6 to 8

Evaluation samples were produced in the same way as Example 1, except that different types of polyphenols were used in preparing the surface layer forming compositions.

Gallic acid: gallic acid monohydrate, a reagent manufactured by WAKO PURE CHEMICAL INDUSTRIES, LTD.

Pyrogallol: a reagent manufactured by WAKO PUKE CHEMICAL INDUSTRIES, LTD.

(−)-Catechin: a reagent manufactured by WAKO PURE CHEMICAL INDUSTRIES, LTD.

Examples 9 to 12

Evaluation samples were produced in the same way as Example 1, except that different amounts of tannic acids were contained therein in preparing the surface layer forming compositions.

Examples 13 to 14

Evaluation samples were produced in the same way as Example 1, except that different types of polymers were used in preparing the surface layer forming compositions.
Polyurethane: "ADEKA BONTIGHTER-HUX-320" manufactured by ADEKA CORPORATION
Acrylic resin: "VONCOAT550EF" manufactured by DIC CORPORATION

Comparative Examples 1 to 5

Evaluation samples were produced in the same way as Examples 1 to 5, except that no polyphenol was contained therein in preparing the surface layer forming compositions.

Comparative Examples 6 to 7

Evaluation samples were produced in the same way as Example 1, except that ascorbic acid or BHT, instead of polyphenol, was contained therein in preparing the surface layer forming compositions.
Ascorbic acid: a reagent manufactured by KANTO CHEMICAL CO., INC.
BHT: Di-tert-butylhydroxytoluene, a reagent manufactured by Tokyo Chemical Industry Co., Ltd.

Comparative Example 8

An evaluation sample was produced in the same way as Comparative Example 1, except that a different type of polymer was used in preparing the surface layer forming composition.
Polyurethane: "ADEKA BONTIGHTER-HUX-320" manufactured by ADEKA CORPORATION

Reference Example

An evaluation sample was produced in the same way as Example 1, except that no ionic conductive agent was contained therein in preparing the conductive rubber composition, and except that no polyphenol was contained therein in preparing the surface layer forming composition.

The thus-produced evaluation samples were evaluated in terms of durability (crack), hardness variation, and setting properties. The results are shown in Table 1.

Durability (Crack) and Hardness Variation

Electrodes having a diameter of 30 mm were placed on both sides of each of the produced evaluation samples. The electrodes on the top surfaces (the surfaces on the surface layer sides) were defined as positive terminals, and the evaluation samples were energized at 1000 V for 30 minutes (an endurance test). Then, after the evaluation samples had been left for one week, a sensing pin was pushed in from the surfaces of the evaluation samples with the use of a universal hardness meter ("Fischer scope H100" manufactured by FISCHER GMBH) under a constant load of 10 mN/30 seconds, and Martens hardnesses of energized portions and non-energized portions of the evaluation samples were measured. The differences between the Martens hardnesses of the energized portions and the Martens hardnesses of the non-energized portions define hardness variations. The evaluation samples of which a hardness variation was 0.20 or less were evaluated as "very good", the evaluation samples of which a hardness variation was 0.21 to 0.30 were evaluated as "good", and the evaluation samples of which a hardness variation was 0.31 or more were evaluated as "poor".

In addition, the evaluation samples were bent by 180 degrees after the endurance tests, and then visually checked for cracks. The evaluation samples in which no crack was made were evaluated as "good", and the evaluation samples in which a crack was made were evaluated as "poor".

Setting Properties

A sensing pin was pushed in from the surfaces of the evaluation samples with the use of a universal hardness meter ("Fischer scope H100" manufactured, by FISCHER GMBH) under a constant load of 10 mN/30 seconds, and their elastic recovery rates were calculated. The evaluation samples of which an elastic recovery rate was 60% or more were evaluated as "very good", the evaluation samples of which an elastic recovery rate was 50% or more and less than 60% were evaluated as "good", and the evaluation samples of which an elastic recovery rate was less than 50% were evaluated as "poor".

TABLE 1

|  | Example | | | | | | | | | | | |
|---|---|---|---|---|---|---|---|---|---|---|---|---|
|  | 1 | 2 | 3 | 3 | 5 | 6 | 7 | 8 | 9 | 10 | 11 | 12 |
| Composition for conductive rubber elastic body layer | | | | | | | | | | | | |
| ECO | 100 | 100 | 100 | 100 | 100 | 100 | 100 | 100 | 100 | 100 | 100 | 100 |
| Ion conductive agent <1>: ClO4— | 3 | — | — | — | — | 3 | 3 | 3 | 3 | 3 | 3 | 3 |
| Ion conductive agent <2>: Br— | — | 3 | — | — | — | — | — | — | — | — | — | — |
| Ion conductive agent <3>: Cl— | — | — | 3 | — | — | — | — | — | — | — | — | — |
| Ion conductive agent <4>: TF | — | — | — | 3 | — | — | — | — | — | — | — | — |
| Ion conductive agent <5>: TFSI | — | — | — | — | 3 | — | — | — | — | — | — | — |
| Cross-linking agent (sulfur) | 2 | 2 | 2 | 2 | 2 | 2 | 2 | 2 | 2 | 2 | 2 | 2 |
| Composition for surface layer | | | | | | | | | | | | |
| N-methoxymethylated nylon | 100 | 100 | 100 | 100 | 100 | 100 | 100 | 100 | 100 | 100 | 100 | 100 |
| Polyurethane | — | — | — | — | — | — | — | — | — | — | — | — |
| Acrylic resin | — | — | — | — | — | — | — | — | — | — | — | — |
| Tannin | 2 | 2 | 2 | 2 | 2 | — | — | — | 0.2 | 0.3 | 5 | 6 |
| Apidum gallicum | — | — | — | — | — | 2 | — | — | — | — | — | — |
| Pyrogallic acid | — | — | — | — | — | — | 2 | — | — | — | — | — |

TABLE 1-continued

| | Example | | | | | | | | | | | |
|---|---|---|---|---|---|---|---|---|---|---|---|---|
| | 1 | 2 | 3 | 3 | 5 | 6 | 7 | 8 | 9 | 10 | 11 | 12 |
| (-)-Catechin | — | — | — | — | — | — | — | 2 | — | — | — | — |
| Ascorbic acid | — | — | — | — | — | — | — | — | — | — | — | — |
| BHT | — | — | — | — | — | — | — | — | — | — | — | — |
| Electroconductive agent (CB) | 15 | 15 | 15 | 15 | 15 | 15 | 15 | 15 | 15 | 15 | 15 | 15 |
| Citric acid | 1 | 1 | 1 | 1 | 1 | 1 | 1 | 1 | 1 | 1 | 1 | 1 |
| Methanol | 300 | 300 | 300 | 300 | 300 | 300 | 300 | 300 | 300 | 300 | 300 | 300 |
| Durability (crack) | | | | | | | | | | | | |
| Hardness variation | Very good | Very good | Very good | Very good | Very good | Very good | Very good | Very good | Good | Very good | Very good | Very good |
| Setting properties | Very good | Very good | Very good | Very good | Very good | Very good | Very good | Very good | Very good | Very good | Very good | Good |

| | Example | | Comparative Example | | | | | | | | Reference |
|---|---|---|---|---|---|---|---|---|---|---|---|
| | 13 | 14 | 1 | 2 | 3 | 4 | 5 | 6 | 7 | 8 | Example |
| Composition for conductive rubber elastic body layer | | | | | | | | | | | |
| ECO | 100 | 100 | 100 | 100 | 100 | 100 | 100 | 100 | 100 | 100 | 100 |
| Ion conductive agent <1>: ClO4— | 3 | 3 | 3 | — | — | — | — | 3 | 3 | 3 | — |
| Ion conductive agent <2>: Br— | — | — | — | 3 | — | — | — | — | — | — | — |
| Ion conductive agent <3>: Cl— | — | — | — | — | 3 | — | — | — | — | — | — |
| Ion conductive agent <4>: TF | — | — | — | — | — | 3 | — | — | — | — | — |
| Ion conductive agent <5>: TFSI | — | — | — | — | — | — | 3 | — | — | — | — |
| Cross-linking agent (sulfur) | 2 | 2 | 2 | 2 | 2 | 2 | 2 | 2 | 2 | 2 | 2 |
| Composition for surface layer | | | | | | | | | | | |
| N-methoxymethylated nylon | — | — | 100 | 100 | 100 | 100 | 100 | 100 | 100 | — | 100 |
| Polyurethane | 100 | — | — | — | — | — | — | — | — | 100 | — |
| Acrylic resin | — | 100 | — | — | — | — | — | — | — | — | — |
| Tannin | 2 | 2 | — | — | — | — | — | — | — | — | — |
| Apidum gallicum | — | — | — | — | — | — | — | — | — | — | — |
| Pyrogallic acid | — | — | — | — | — | — | — | — | — | — | — |
| (-)-Catechin | — | — | — | — | — | — | — | — | — | — | — |
| Ascorbic acid | — | — | — | — | — | — | — | 2 | — | — | — |
| BHT | — | — | — | — | — | — | — | — | 2 | — | — |
| Electroconductive agent (CB) | 15 | 15 | 15 | 15 | 15 | 15 | 15 | 15 | 15 | 15 | 15 |
| Citric acid | 1 | 1 | 1 | 1 | 1 | 1 | 1 | 1 | 1 | 1 | 1 |
| Methanol | 300 | 300 | 300 | 300 | 300 | 300 | 330 | 300 | 300 | 300 | 300 |
| Durability (crack) | | | | | | | | | | | |
| Hardness variation | Very good | Very good | Poor | Poor | Poor | Poor | Poor | Poor | Poor | Poor | Very good |
| Setting properties | Very good | Very good | Very good | Very good | Very good | Very good | Very good | Very good | Very good | Very good | Very good |

According to the reference example and the comparative examples, it was obvious that there arose some problems caused by hardness variation and cracks in the surface layers under the influence of the ionic conductive agents. Since Comparative Examples 1 to 8 contained no polyphenol in their surface layers, their surface layers had large hardness variation after the endurance under the energized condition, which caused cracks in the surface layers. Meanwhile, since Examples 1 to 14 contained polyphenol in their surface layers, their surface layers had small hardness variation after the endurance under the energized condition, which caused no crack in the surface layers. In addition, Examples 1 to 14 were found to be excellent in setting properties.

While some of the embodiments of the present invention have been described in detail, the embodiments of the present invention are not limited to the above-described embodiments, and various modifications can be made without departing from the gist of the embodiments of the present invention.

The invention claimed is:

1. A conductive member for an electrophotographic machine, the member comprising:
    a conductive rubber elastic body layer comprising a crosslinked rubber and an ionic conductive agent; and
    a surface layer provided on an outer periphery of the conductive rubber elastic body layer, the surface layer comprising:
        a polymer; and
        a polyphenol.

2. The conductive member for an electrophotographic machine according to claim 1,
    wherein the ionic conductive agent comprises anions that comprise one or more kinds selected from the group consisting of perchlorate anions, bis(trifluoromethanesulfonyl)imide anions, trifluoromethanesulfonate anions, chloride anions, bromide anions, and p-toluenesulfonate anions.

3. The conductive member for an electrophotographic machine according to claim 2,
    wherein the polyphenol comprises one or more kinds selected from the group consisting of a tannin, gallic acid, ellagic acid, pyrogall acid, catechin, and chlorogenic acid.

4. The conductive member for an electrophotographic machine according to claim 3, wherein the tannin comprises a hydrolyzable tannin.

5. The conductive member for an electrophotographic machine according to claim 4, wherein the surface layer comprises a nylon.

6. The conductive member for an electrophotographic machine according to claim 5, wherein the surface layer comprises N-methoxymethylated nylon.

7. The conductive member for an electrophotographic machine according to claim 6, wherein the anions comprise the perchlorate anions.

8. The conductive member for an electrophotographic machine according to claim 7, wherein the conductive member is a charging roll.

9. The conductive member for an electrophotographic machine according to claim 6, wherein the anions comprise the bis(trifluoromethanesulfonyl)imide anions.

10. The conductive member for an electrophotographic machine according to claim 9, wherein the conductive member is a charging roll.

11. The conductive member for an electrophotographic machine according to claim 2, wherein the anions comprise perchlorate anions.

12. The conductive member for an electrophotographic machine according to claim 11, wherein the conductive member is a charging roll.

13. The conductive member for an electrophotographic machine according to claim 2, wherein the anions comprise the bis(trifluoromethanesulfonyl)imide anions.

14. The conductive member for an electrophotographic machine according to claim 1, wherein the polyphenol comprises one or more kinds selected from the group consisting of a tannin, gallic acid, ellagic acid, pyrogallol acid, catechin, and chlorogenic acid.

15. The conductive member for an electrophotographic machine according to claim 14, wherein the tannin comprises a hydrolyzable tannin.

16. The conductive member for an electrophotographic machine according to claim 15, wherein the conductive member is a charging roll.

17. The conductive member for an electrophotographic machine according to claim 1, wherein the surface layer comprises a nylon.

18. The conductive member for an electrophotographic machine according to claim 17, wherein the surface layer comprises N-methoxymethylated nylon.

19. The conductive member for an electrophotographic machine according to claim 18, wherein the conductive member is a charging roll.

20. The conductive member for an electrophotographic machine according to claim 1, wherein the conductive member is a charging roll.

* * * * *